(12) United States Patent
Huang

(10) Patent No.: US 8,528,766 B2
(45) Date of Patent: *Sep. 10, 2013

(54) EXPLOSION PROOF AND ENVIRONMENT PROTECTIVE OIL (GAS) REFUELING EQUIPMENT

(75) Inventor: Xiaodong Huang, Beijing (CN)

(73) Assignee: Shanghai Huapeng Explosion-Proof Science and Technology Co., Ltd., Shanghai (CN)

( * ) Notice: Subject to any disclaimer, the term of this patent is extended or adjusted under 35 U.S.C. 154(b) by 244 days.

This patent is subject to a terminal disclaimer.

(21) Appl. No.: 12/866,007

(22) PCT Filed: Feb. 3, 2008

(86) PCT No.: PCT/CN2008/000287
§ 371 (c)(1),
(2), (4) Date: Aug. 3, 2010

(87) PCT Pub. No.: WO2009/100572
PCT Pub. Date: Aug. 20, 2009

(65) Prior Publication Data
US 2011/0000909 A1    Jan. 6, 2011

(51) Int. Cl.
*B60S 5/02* (2006.01)
(52) U.S. Cl.
USPC ........................................................ 220/88.1
(58) Field of Classification Search
USPC ............. 220/88.2, 88.1, 567.1, 567.2, 567.3, 220/560.03, 86.1; 206/0.6
See application file for complete search history.

(56) References Cited

U.S. PATENT DOCUMENTS

| | | | | |
|---|---|---|---|---|
| 4,925,053 A * | 5/1990 | Fenton et al. | | 220/88.1 |
| 5,305,926 A * | 4/1994 | Webb | | 220/88.1 |
| 6,604,644 B1 * | 8/2003 | Fenton | | 220/88.1 |
| 8,002,136 B2 * | 8/2011 | Huang | | 220/88.1 |
| 2006/0086735 A1 * | 4/2006 | Weerth | | 220/88.1 |
| 2008/0305299 A1 * | 12/2008 | Diaz Del Rio Perez | | 428/134 |
| 2010/0147857 A1 * | 6/2010 | Huang | | 220/560.03 |

* cited by examiner

Primary Examiner — Andrew Perreault
(74) Attorney, Agent, or Firm — McNeely, Hare & War LLP; Kevin J. McNeely, Esq.

(57) ABSTRACT

An explosion proof and environment protective oil (gas) refueling equipment includes an oil (gas) storage tank connected with a refueling machine. The inner chamber of the oil (gas) storage tank is filled with an explosion-proof material, which is a multi-layer material unit made of high porosity lamellar materials, with a fixed supporting part being set in this material unit for fixing and supporting the unit, a skid is set under the oil (gas) storage tank and the oil (gas) refueling machine. A plurality of said units is orderly installed in the inner chamber of the oil storage tank, with reasonable installing method and structure. With the fixed supporting part being installed in the unit, the explosion-proof material units have adequate strength and elasticity so as to effectively prevent the collapse and distortion of the high porosity lamellar material in the tank, thus the unexpected explosion hazards that may be caused by naked flame, static electricity, welding, gunshot, collision and faulty operation can be prevented and safety of oil (gas) refueling equipment can be ensured. The explosion-proof material unit being covered with a metal protective mesh which can effectively prevent scraps from getting into the medium in the tank and causing harmful effect on the content medium thereof.

8 Claims, 13 Drawing Sheets

EXPLOSION PROOF AND ENVIRONMENT PROTECTIVE OIL (GAS) REFUELING EQUIPMENT

TECHNICAL FIELD

The present invention relates to an explosion proof and environment protective oil (gas) refueling equipment and in particular to oil (gas) refueling equipment for vehicles.

BACKGROUND

At present, most of the conventional oil (gas) refueling equipments are buried (underground) oil (gas) refueling station. In such refueling station, in order to guarantee the safety of oil (gas) refueling station, the oil (gas) storage tanks are embedded underground, so that such oil (gas) refueling station is distinguished as buried oil (gas) refueling station. In addition, some storage tanks are set above ground and form removable (also referred to as skid mounted type) above-ground refueling equipments. According to the working pressure conditions of the oil (gas) storage tank bodies, the storage tanks in the oil (gas) refueling equipments may be classified as atmospheric storage tanks and pressure-bearing tanks. According to the specification requirements for storage tank, the storage tanks in the oil (gas) refueling equipments may also be classified as standard tanks and non-standard tanks. To ensure the safety of the oil (gas) refueling equipment, the most conventional explosion prevention measure available is to fill the tank body with explosion-proof material so as to prevent the medium stored in the tank body of the oil (gas) refueling equipment, such as inflammable and or explosive dangerous chemicals in liquid or gaseous state, from combustion or explosion triggered by unexpected accidents such as static electricity, naked flame and gunshot.

The available explosion-proof material is a kind of reticular lamellar material, which is rolled into a cylinder body and is then installed into the tank body one by one as filling material. This explosion-proof material has been disclosed in the invention patent ZL 92102437. Such material is installed into the tank body as explosion proof filling material after being rolled into cylinder body. Due to long-term immersion, the material located at the lower part of tank body bears very large load, and the mutual stacking, pressing and extruding between the material bodies result in the distortion and collapse of the material, generating serious effects on the blocking and explosion-resisting abilities of such material. As a result, an explosive space will be formed in the upper part of the tank body, which tends to cause combustion and explosion. Meanwhile, because most of the available explosion-proof materials are made of metal materials, they are liable to generate scraps due to the uneven force imposed on them upon occurrence of flow surge of the medium in the storage tank body, thus bringing about disadvantageous effects on the properties of the content in the storage tank.

In addition, in case of small volume storage tanks, due to the volume restriction, the available explosion-proof materials installed as filling material in the small-volume storage tanks are generally built up in spherical structure, and are packed in great density and take up considerable occupation.

Although in short run, it is practical to avoid the "boiling liquid expanding-vapor explosion" accident of a LPG tank when the LPG tank is filled with such a explosion-proof material, such explosion-proof material is still liable to collapse after long-term use so that the explosion prevention effect cannot be achieved for the same reasons.

Practice has proved that, all kinds of oil (gas) refueling equipments filled with the conventional explosion-proof materials have shown inadequacy in terms of meeting the explosion prevention and environment protection requirements for them.

SUMMARY

Aiming at overcoming the deficiency of prior art, the first technical object of the present invention is to provide an explosion proof and environment protective oil (gas) refueling equipment, wherein the tank body of the oil (gas) refueling equipment is filled in appropriate manner and structure with a unit of explosion-proof material comprising a fixed supporting part such that the collapse and distortion of the high porosity lamellar material can be effectively prevented and the unit thus have adequate strength and elasticity. In this way the unexpected explosion that may be caused by naked flame, static electricity, welding, gunshot, collision and faulty operation can be prevented, and the safety of oil (gas) storage tanks and the oil (gas) refueling equipments is ensured.

The second technical objective of the present invention is to provide an explosion proof and environment protective oil (gas) refueling equipment, characterized in that the outside surface of each explosion-proof material unit is covered with metal protective mesh so that the harmful effect on the medium in tank body imposed by the scraps is then effectively prevented.

The third technical objective of the present invention is to provide an explosion proof and environment protective oil (gas) refueling equipment, characterized in that a skid means is set on the outside of the storage tank; with said skid means the storage tank may be fixed on various locations, such as, on the ground position, underground, in a container or a vehicle or a ship etc. so as to save area, facilitate disassembly and assembly and cut cost.

The above technical objectives of the present invention are achieved through the technical solutions described as follows:

An explosion proof and environment protective oil refueling equipment at least comprises an oil storage tank which is connected with a refueling machine. This oil storage tank is an atmospheric double walled tank. A high porosity lamellar material is installed as filling material in the interlayer between the two-layer tank walls. An explosion-proof material is installed as a filling material in the inner chamber of the oil storage tank. A skid is set under the oil storage tank and refueling machine. Said explosion-proof material is a multi-layer material unit made of high porosity lamellar materials. A fixed supporting part is set in this unit for fixing and supporting the unit. A plurality of said units is orderly installed in the inner chamber of the oil storage tank.

According to one aspect of the present invention, said unit is made of high porosity lamellar materials. Said fixed supporting part is a skeleton set in the spaces between any two layers of high porosity lamellar materials of this unit, and this skeleton is designed for fixing and supporting the unit.

Said skeleton may be formed by interweaved supporting frame and reinforcing rings. The reinforcing rings are threaded in the middle of the supporting frame and are fixed onto it, with the shape of skeleton corresponding to that of the unit. Said skeleton may be composed of upright column and crossbeam. The upright column is inserted between any two layers of the multi-layer high porosity lamellar materials and protrudes from the upper and lower end faces of the unit, and the crossbeam is adjoined with the protruding parts of the upright column on the upper and lower end faces of the unit.

Said skeleton may also be composed of multiple frames, which are set between any two layers of the multilayer high porosity lamellar materials of unit and connected with each other at their top and bottom ends. Said skeleton may also be composed of two parts, namely upper skeleton and lower skeleton, which respectively includes interconnected end frame and inserting frame. Said end frames are set on the upper and lower end faces of the unit, and said inserting frames are inserted and extended through between any two layers of the multilayer high porosity lamellar materials in the unit, so as to fix and support the unit.

According to another aspect of the present invention, said unit may be composed of a core body and a metal mesh. Said fixed supporting part is the core body made of expandable foaming material, the core body is enwound with a metal mesh covering the outside surface of said core body partially or completely.

According to another aspect of the present invention, said unit may be composed of the cord body and the expandable foaming material. Said fixed supporting part is the core body made of metal mesh, the outside of which is covered with the expandable foaming material.

Said units are installed as filling material in the inner chamber of an oil storage tank, with two adjacent units being interconnected or not being connected.

To prevent scraps from getting into the tank body, the outside of each said unit is covered with metal protective mesh.

Said skid is fixed onto an anti-collision foundation to form an ground oil refueling equipment, or it is attached with the elevating mechanism of a refueling machine and the tunnel base of a tank pool to form an underground oil refueling equipment, or it can be attached with the fixed platform of a vehicle body or ship hull to form a vehicle/ship mounted oil refueling equipments, or it is fixed onto the inner bottom plate of a container to form a container type oil refueling equipment.

Another aspect of the present invention provides an explosion proof and environment protective gas refueling equipment, which at least comprises a gas storage tank, and which is connected with a gas refueling machine. Said gas storage tank is a pressure-bearing single walled gas tank, in the inner chamber of which the explosion-proof material is installed. A skid is set under the gas storage tank and gas refueling machine. Said explosion-proof material is multilayer material unit made of high porosity material. The fixed supporting part is set in this unit to fix and support the unit. A plurality of said units is orderly installed in the inner chamber of the storage tank.

Said unit is made of high porosity lamellar materials. Said fixed supporting part is a skeleton inserted in the spaces between any two layers of said high porosity lamellar materials of this unit, which is designed for fixing and supporting the unit.

Said skeleton may be formed by interweaved supporting frame and reinforcing ring. The reinforcing rings are threaded in the middle of the supporting frame and are fixed onto it, with the shape of skeleton corresponding to that of the unit. Said skeleton may be composed of upright column and crossbeam. The upright column is inserted between any two layers of the multiple-layer high porosity lamellar materials of the unit and protrudes from the upper and lower end faces of unit. The crossbeam is adjoined with the protruding parts of the upright column on the upper and lower end faces of unit. Said skeleton may also be composed of multiple frames, which are set between any two layers of the multilayer high porosity lamellar materials of the unit and connected with each other at their top and bottom ends. Said skeleton may also be composed of two parts, namely upper skeleton and lower skeleton, which respectively includes interconnected end frame and inserting frame. Said end frames are set on the upper and lower end faces of the unit, and said inserting frames are inserted and extended through between any two layers of the multilayer high porosity lamellar materials of the unit so as to fix and support the unit.

A plurality of said explosion proof material units are installed as a filling material in the inner chamber of gas storage tank with two adjacent units being interconnected.

To prevent scraps from getting into the tank body, the outside of each said material unit is covered with metal protective mesh.

Said skid is fixed onto an anti-collision foundation so as to form an ground gas refueling equipment, or it is attached with the elevating mechanism of a refueling machine and the tunnel base of a gas tank pool to form an underground gas refueling equipment, or it can be attached to the fixed platform of a vehicle body or ship hull to form a vehicle/ship mounted gas refueling equipments, or it is fixed onto the inner bottom plate of a container to form a container type gas refueling equipment.

To sum up, the beneficial effects of the present invention consist in the following respects: the unit of explosion-proof material with fixed supporting part, which has increased strength and elasticity, are installed as filling material into the tank to effectively prevent the collapse and distortion of the high porosity lamellar material so as to effectively prevent the unexpected explosion hazards that may be caused by naked flame, static electricity, welding, gunshot, collision and faulty operation, thus ensuring the entity safety of oil (gas) storage tank and its oil (gas) refueling equipment. The outside of each explosion-proof material unit is covered with a metal protective mesh which can effectively prevent the harmful effect caused by the scraps on the content medium in the tank and prevent the scraps generated by the explosion-proof material unit from blocking the oil (gas) pipeline. The storage tanks may be fixed on various locations such as, on the ground, underground position, in a container or a vehicle or a ship by means of the skid set on the outside of storage tank, so as to save area, facilitate disassembly and assembly and cut cost.

The technical solution of the present invention is further elaborated below in combination with the attached figures and embodiments.

DETAILED DESCRIPTION

Embodiment 1

Figure 1:
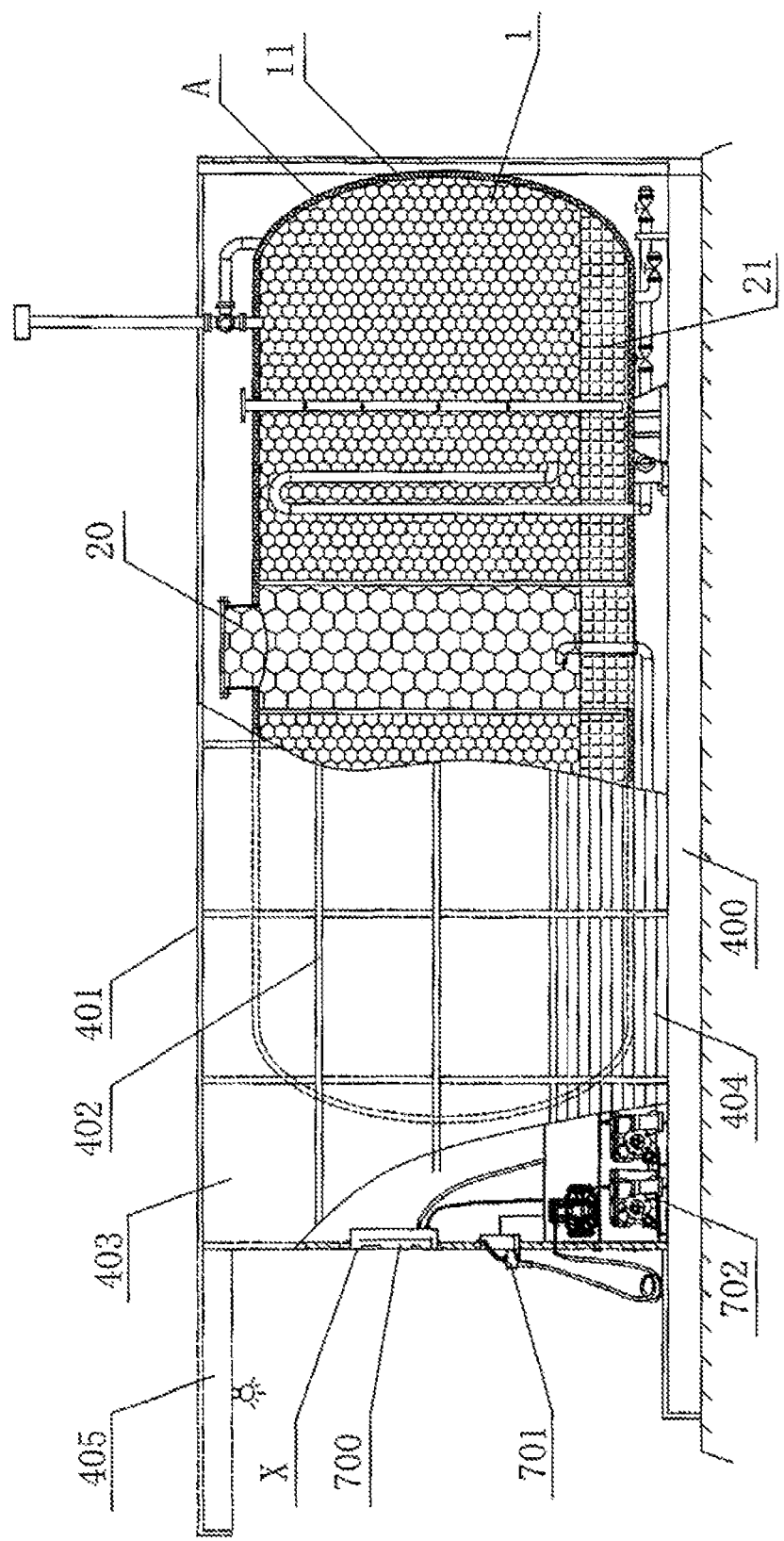
FIG. 1 is the overall structural scheme of the ground oil refueling equipment of embodiment 1 of the present invention.

FIG. 1 is the overall structural scheme of the ground oil refueling equipment of embodiment 1 of present invention. As shown in FIG. 1, this embodiment provides a removable, explosion proof and environment protective ground oil refueling equipment. The oil-storage tank A of this equipment is a double walled tank that is connected with the oil refueling machine X. A skid 400 is set under the oil-storage tank A and the oil refueling machine X. By means of the skid 400 the oil refueling equipment can be relocated and moved. This oil-storage tank A is an atmospheric double walled tank, in which a vertical well 20 and a decontaminating tunnel 21 are provided to facilitate cleaning and servicing. A high porosity lamellar material 11 is installed as a filling material in the interlayer between the two-layer tank walls. The vertical well 20 is set in the tank body, and its top is set on a position corresponding to the position of manhole cover. This vertical well 20 is a standing structure that vertically extends along the radial direction of the tank body, and its bottom is connected with the cleaning tunnel 21 set at the bottom of tank body. A plurality of lining container (not shown in the figure) are set inside the enclosure of vertical well 20; Each of said lining containers is filled with unit 1 of explosion-proof material. The units 1 of explosion-proof material are also installed in the inner chamber of the oil-storage, and two adjacent units 1 may be interconnected or not connected.

Figure 2:
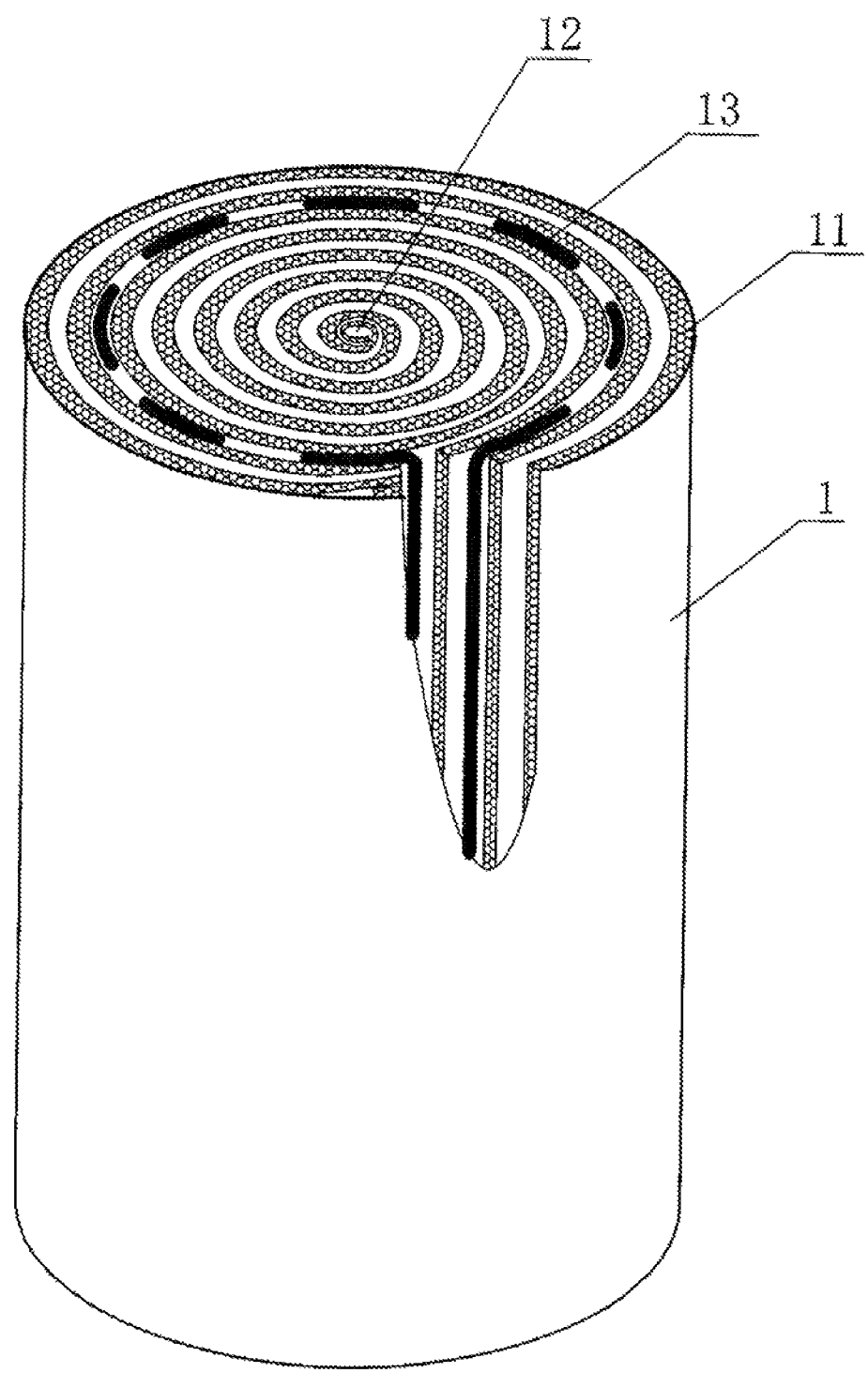
FIG. 2 is the overall structural scheme of the first unit with the explosion-proof material.

The major technical characteristics of said explosion-proof material have been disclosed in details in the previous PCT application titled "An explosion-proof material and its processing method" (with application number of "PCT/CN2007/002299"). FIG. 2 is the overall structural scheme of the first unit with the explosion-proof material. As shown in FIG. 2, this explosion-proof material comprises a high porosity lamellar material 11 which is rolled into a multi-layer explosion-proof material unit 1 along the direction being perpendicular to one of its end side, with this end side being the roll center. A fixed supporting part, skeleton 13, is inserted into the spaces between any two layers of the multilayer high porosity lamellar materials 11 of the unit, so that the unit has adequate strength and elasticity.

Figure 3:
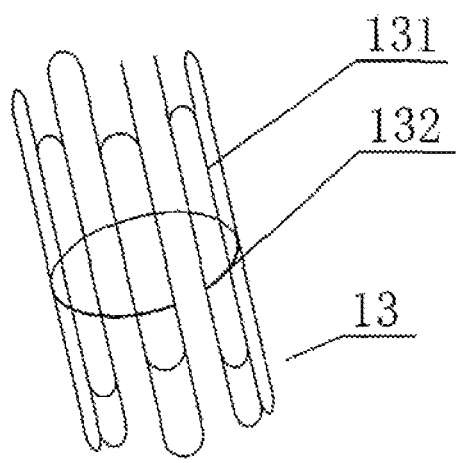
FIG. 3 is the structural scheme of the first skeleton.
Figure 4:
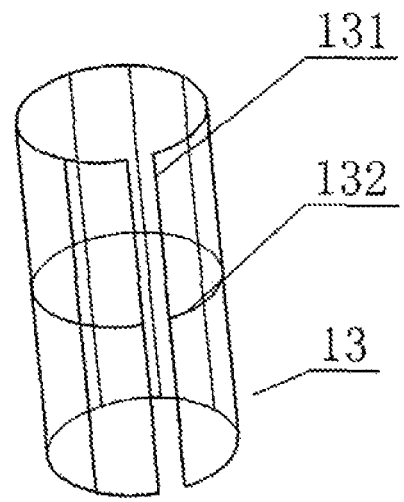
FIG. 4 is the structural scheme of the second skeleton.
Figure 5:
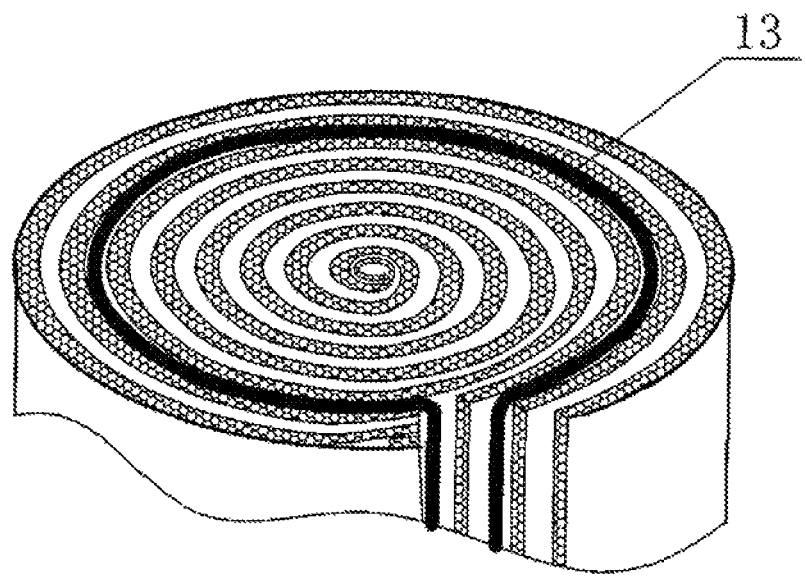
FIG. 5 is the structural scheme of the first setting mode for the second skeleton.
Figure 6:
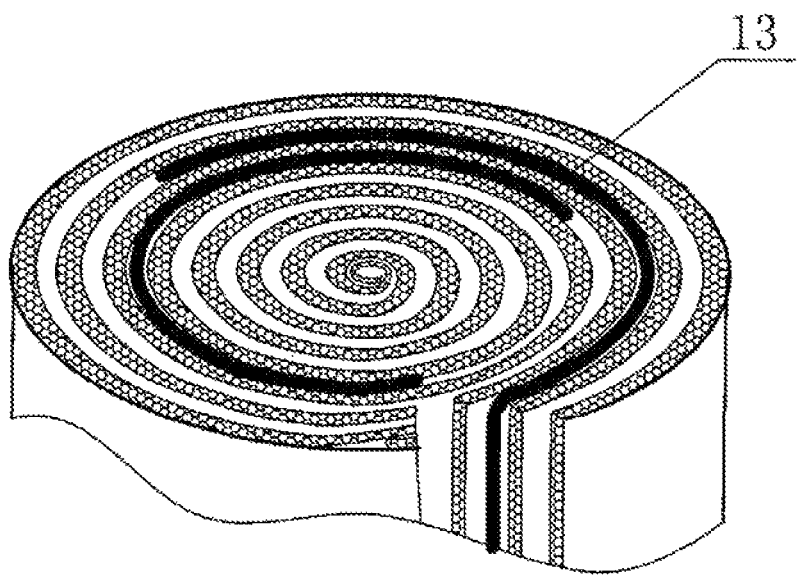
FIG. 6 is the structural scheme of the second setting mode for the second skeleton.
Figure 7:
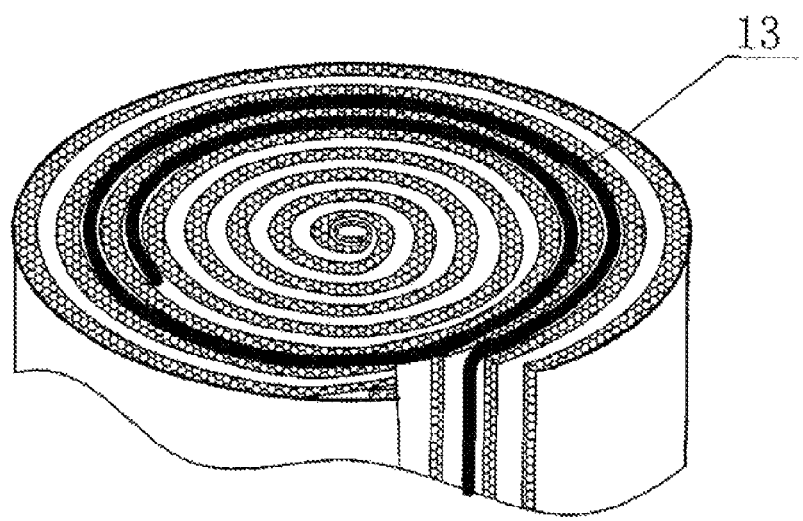
FIG. 7 is the structural scheme of the third setting mode for the second skeleton.
Figure 8:
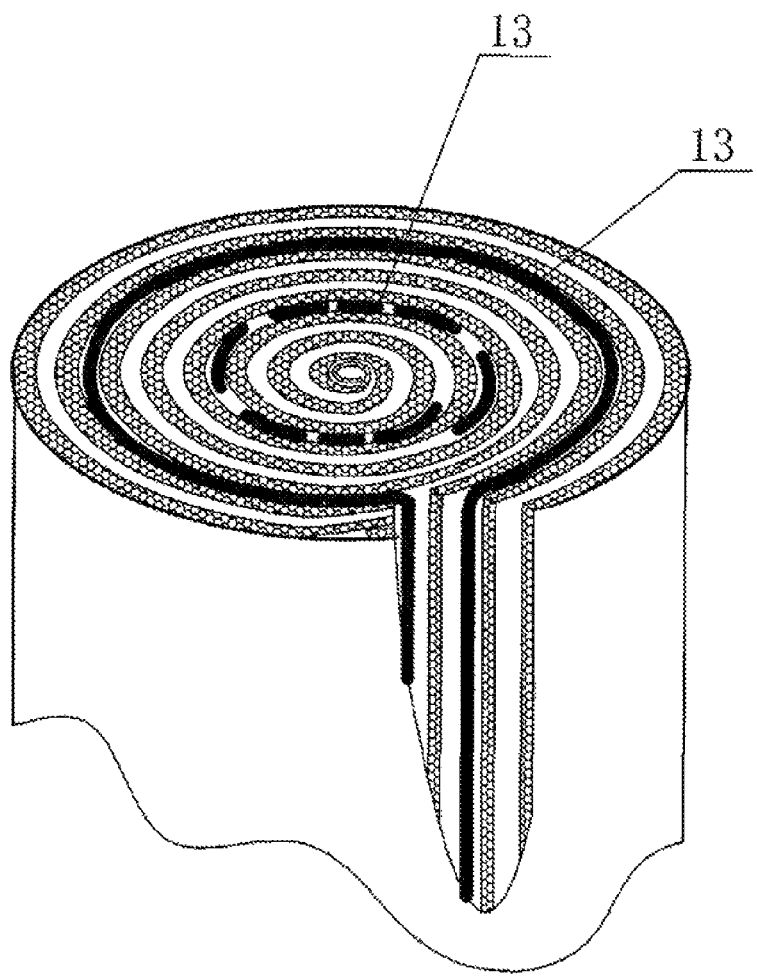
FIG. 8 is the structural scheme of the combined installing of the first and the second skeleton.

According to different needs, the skeleton 13 may be designed in different structural modes. As shown in FIGS. 3 and 4 this skeleton 13 may be composed of inter-weaved supporting frame 131 and reinforcing rings 132. The reinforcing rings 132 are threaded in the middle of the supporting frame 131 and are fixed onto it, with the shape of the skeleton 13 corresponding to that of the unit. The supporting frame 131 may be so designed as to have an undulated line-shaped planar outline (while unrolled) or its planar outline is an arrangement of rectangles. To guarantee that the skeleton has preferable supporting and fixing functions for the explosion-proof material unit, it is advisable to adopt elastic material for the skeleton 13. In addition, the skeleton may also be made of metal material, non-metal material, composite materials or materials obtained with metal/nonmetal coating technology or any combination of these materials.

According to different requirements for the strength in use, the skeleton 13 may be set in multiple modes. As shown in FIGS. 5-8, the skeleton 13 may be designed as continuous skeleton set in single position in the unit having a single layer construction. The skeleton 13 may also be designed as discontinuous skeleton set in multiple positions in the unit having a single layer construction. The skeleton 13 may also be designed as continuous skeleton set in single position in the unit having a multiple layer construction. The above mentioned two kinds of skeletons may be used in combination and set in multiple places in unit as a single layer construction. No matter how the skeleton is set, it is always inserted in the spaces between any two layers of the high porosity lamellar materials 11 of the unit.

Figure 9:
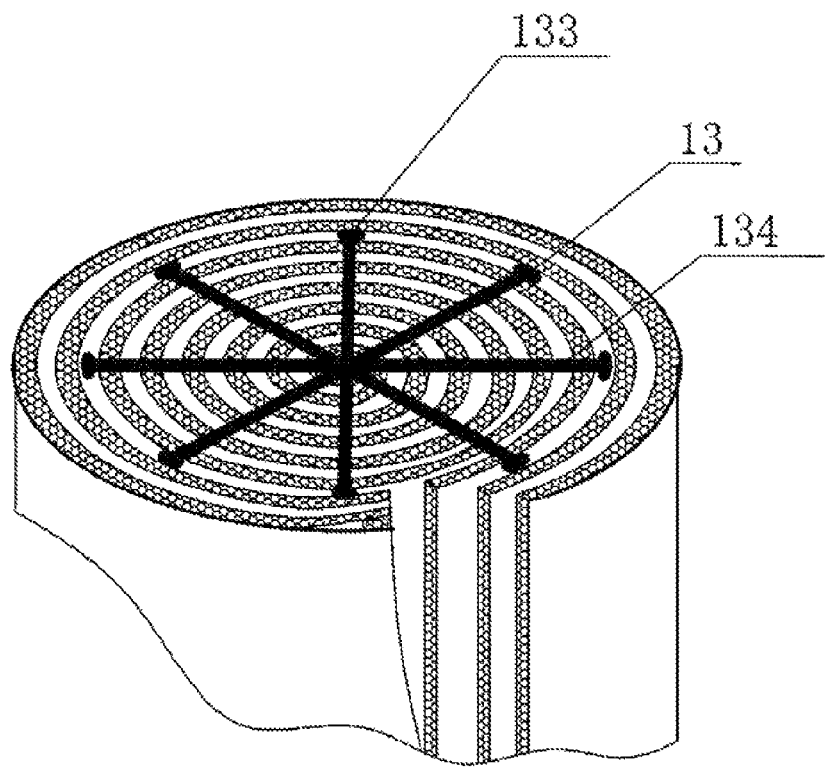
FIG. 9 is the structural scheme of the third skeleton.

As shown in FIG. 9, for the convenience in processing, the skeleton 13 may also be composed of upright column 133 and crossbeam 134. The upright column 133 is inserted into the multilayer high porosity lamellar materials 11 of unit and protrudes from the upper and lower end faces of unit. And the crossbeam 134 and the upright column 133 shall be connected into an integral part while in use.

Figure 10:
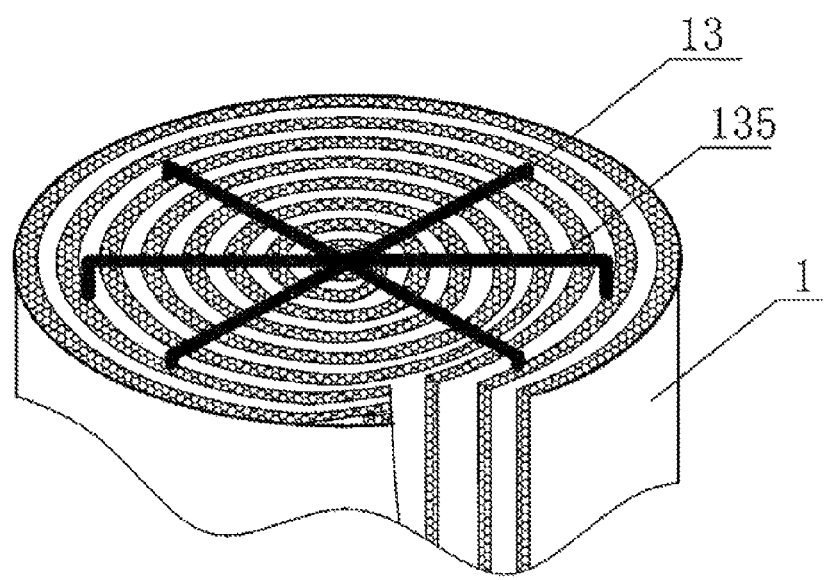
FIG. 10 is the structural scheme of the fourth skeleton.

As shown in FIG. 10, the skeleton 13 may also be composed of a plurality of frames 135. Each frame 135 is inserted into said multilayer high porosity lamellar materials 11 of unit, and more than one frames 135 are interconnected at their tops and bottoms.

Figure 11:
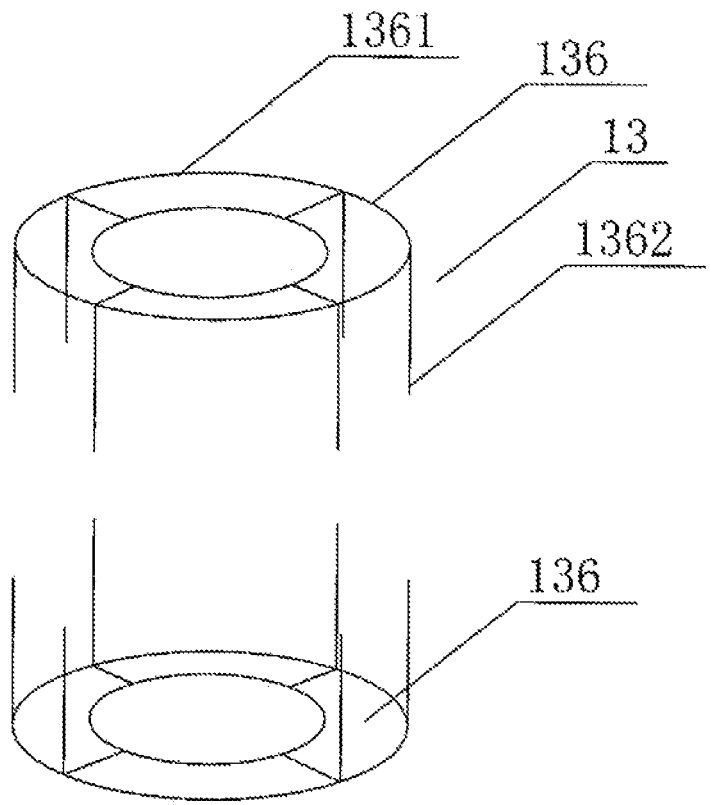
FIG. 11 is the structural scheme of the fifth skeleton.

In addition to this, as shown in FIG. 11, the skeleton 13 may also be composed of two parts, namely the upper and lower skeletons 136. These upper and lower skeletons respectively include interconnected end frames 1361 and inserting frames 1362. The end frames 1361 are respectively set on the upper and lower end faces of unit, and the inserting frames 1362 are inserted and extended in the spaces between two layers of multilayer high porosity lamellar materials 11 of unit, so that the unit has adequate strength and elasticity.

According to different requirements for the positions where the explosion-proof material unit is installed as a filling material in tank body, the shape of explosion-proof material unit 1 may be designed as cuboid, cubic or polygonal column. Meanwhile, the high porosity lamellar material 11 may be metal material, alloy material or materials acquired with metal/nonmetal coating technology or any combination of these materials.

Figure 12:
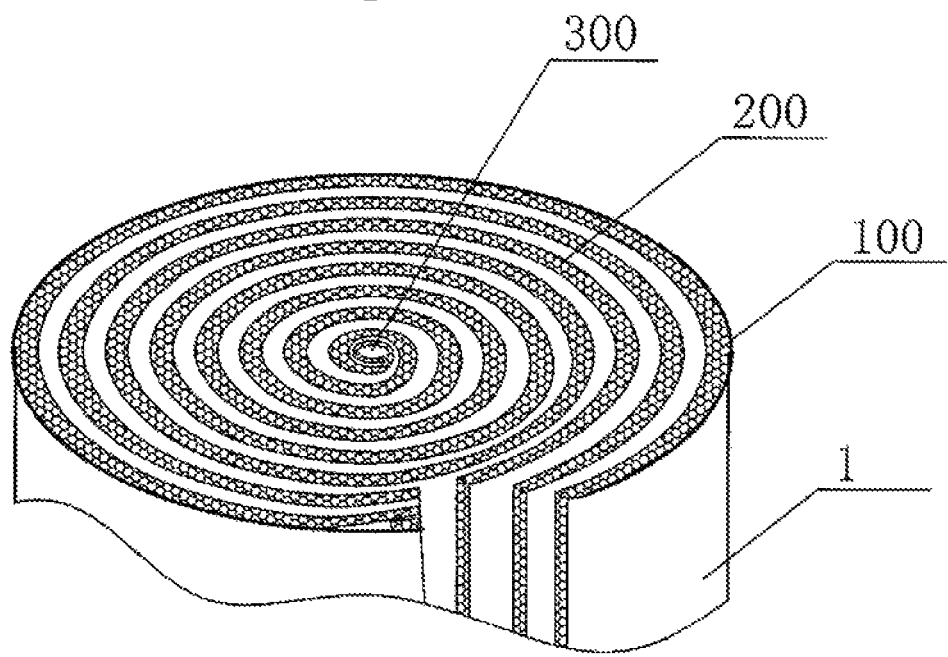
FIG. 12 is the overall structural scheme of the second unit with the explosion-proof material.

In addition to the first unit of the explosion-proof material as shown in FIG. 2, FIG. 12 is the overall structural scheme of the second unit with explosion-proof material. As shown in FIG. 12, this explosion-proof material unit may also includes a core body 300, which is a solid honeycomb-structured skeleton formed out of polyurethane foam material through reticulating process, and which acts as the fixed supporting part. This explosion-proof material unit is in the shape of cylinder, its core body 300 is enwound with multiple layers of metal mesh 200 processed by a tense machine (meshing forming machine). In addition, it is also feasible to put said unit in a mould where the polyurethane material is to be foamed, and the body will be wrapped with the foamed polyurethane material as a coating layer 100 after foaming. Generally, the core body may be made of expandable foaming material, and it may be enwound with metal mesh 200 partially or entirely. Or, this explosion-proof material unit includes a core body 300 made of metal mesh, which also forms the fixed supporting part. The outside surface of core body 300 is covered with expandable foaming material. Said expandable foaming material may be polyether, polycarboxylate ester or polyurethane.

Figure 13:
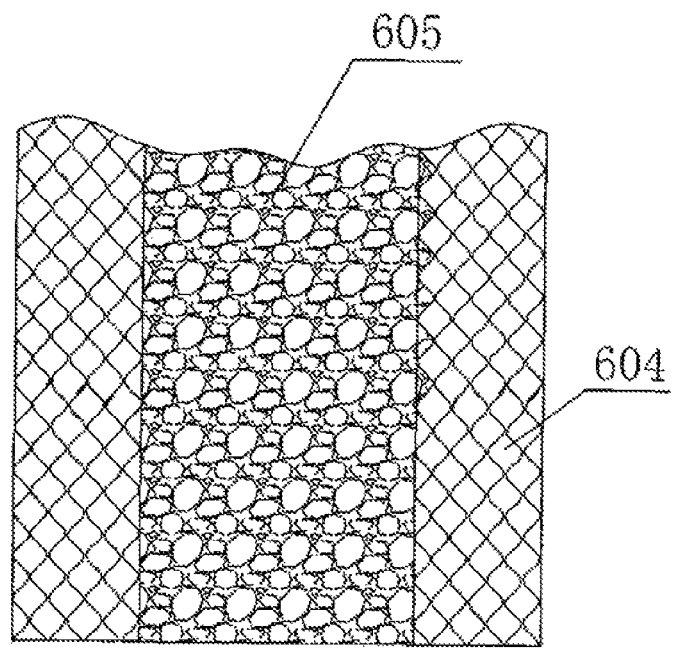
FIG. 13 is the overall structural scheme of the third unit with the explosion-proof material.
Figure 14:
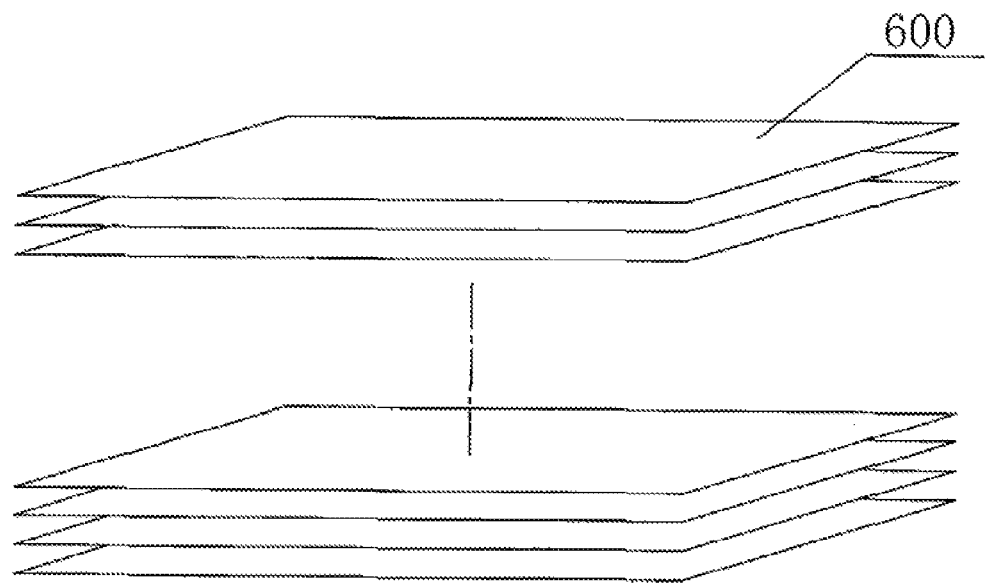
FIG. 14 is the schematic diagram for bonding multilayer foil materials.
Figure 15:
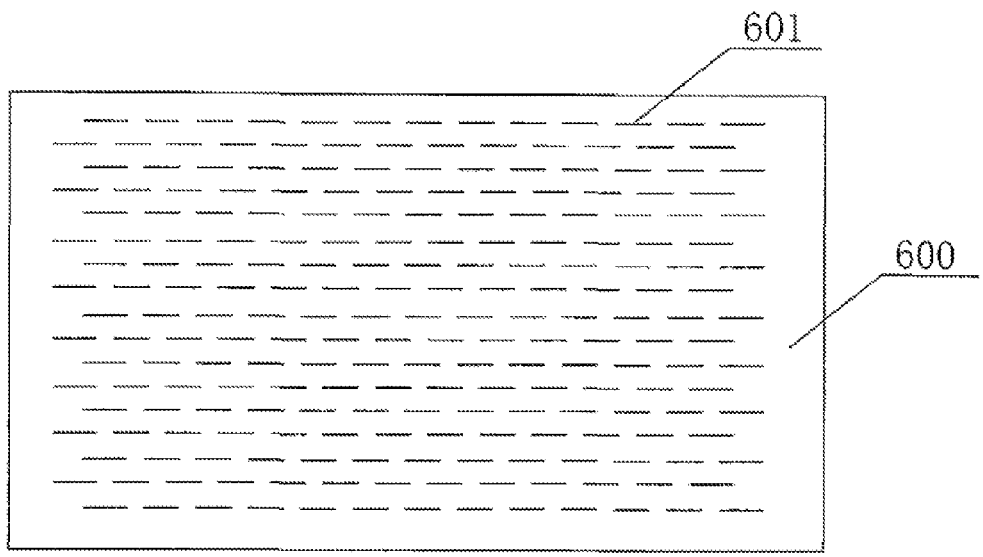
FIG. 15 is the schematic diagram for setting the bonding points on each piece of foil material sheet.
Figure 16:
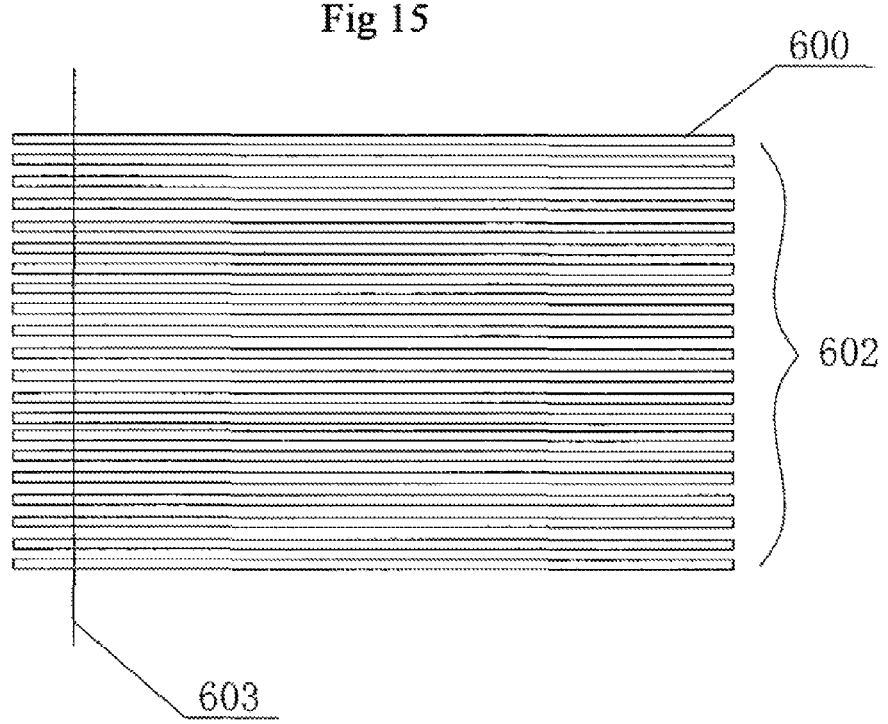
FIG. 16 is the structural scheme of the cutting positions as well as the multilayer foil materials after bonding.
Figure 17:
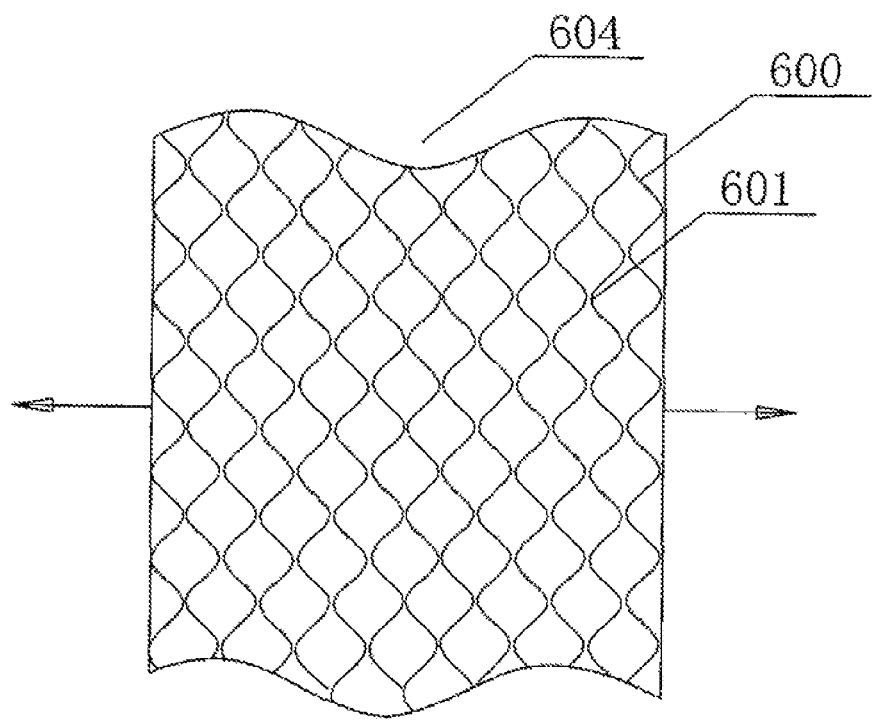
FIG. 17 is the structural scheme of a metal mesh.

FIG. 13 is the overall structural scheme of the third unit of the explosion-proof material. As shown in FIG. 13, the unit 1 is a structure in which the metal mesh winds the core body made of expandable foaming material, and the core body 605, also acting as the fixed supporting part, is sandwiched between two layers of the metal meshes 604. This metal mesh 604 may also be formed through different processing methods. The first processing method for metal mesh is as follows. Through cutting, a flat metal material sheet is made into grid-form semi-finished product. Both sides of the grid-form semi-finished product are gradually expanded outward and pulled into honeycomb reticulation so as to form high porosity lamellar metal mesh. The second processing method for metal mesh is shown as FIGS. 14-17. FIG. 14 is the schematic diagram for bonding multi-layers of the foil material sheets. As shown in FIG. 14, the upper and lower surfaces of any two adjacent layers of the foil material sheets are mutually bonded so as to form a multiple-layered sheet material. FIG. 15 is the schematic diagram for setting the bonding points on each piece of foil material. As shown in FIG. 15, the bonding points 601 on each piece of foil material 600 are set in equal intervals in both horizontal and longitudinal directions. FIG. 16 shows the cutting position and is the structural scheme of the multi-layer foil materials after bonding. As shown in FIG. 16, the bonded multi-layer metal material sheet 602 is cut into an arrangement of slits in the same direction 603. FIG. 17 is the structural scheme of a metal mesh. As shown in FIG. 17, the multilayer material is extended along the direction being perpendicular to the cutting direction, and the interval spaces between the bonding points 601 are expanded into pores, so that a high porosity lamellar metal mesh 604 is formed. The two different metal meshes made by above two processing methods have differences in physical properties. The metal mesh processed by the second method has a higher elasticity and bigger strength and thus can guarantee the strength and elasticity of the explosion-proof material units as shown in FIG. 13.

Figure 18:
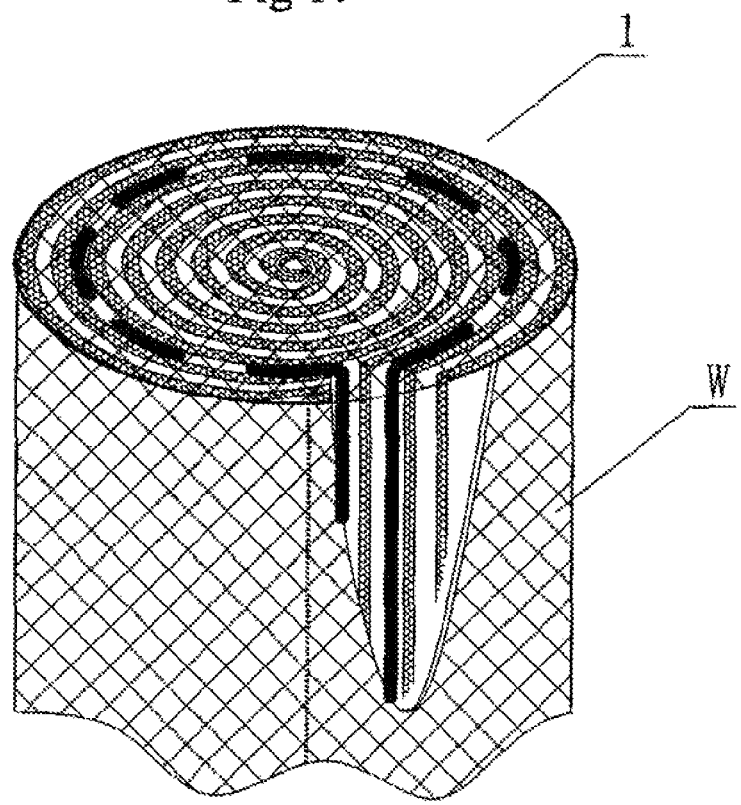
FIG. 18 is the structural scheme of the unit of present invention, the outside of which is covered with a metal protective mesh.

As shown in FIG. 18, the outside of unit 1 is also covered with a metal protective mesh W which can effectively prevent the scraps generated by the explosion-proof material unit during the using process from getting into the tank body and thus causing adverse effects on the content medium of the tank body. When a plurality of units 1 are installed as filling material in the inner chamber of an oil-storage tank A, any two adjacent units may be interconnected to guarantee its stability or may not be connected. The connection between any two adjacent units 1 may be achieved through the connection between the skeletons or metal meshes.

A skid 400 is set under the oil-storage tank A. There is a cover 401 on the skid 400, and multi-lattice frames 402 are welded on the four sides (front, rear, left and right sides) of the cover 401. The frame 402 is provided with an aluminum-plastic plate 403 at its upper part and a shutter 404 at its lower part. A sun block is extended outward at the top of cover 401. In general, the oil refueling machine X in the oil refueling equipment is a digital controlling oil refueling machine. This digital controlling oil refueling machine comprises a digital electronic display 700, a fueling injector 701, and an oil pump case 702 separately set. The digital electronic display 700 and the refueling injector 701 are set on the outside of the cover 401. The digital electronic display 700 also includes an electronic display screen indicating the number of liters, the billing amount and the unit price, as well as an operational keyboard and a display of the liquid level meter. The oil pump case 702 is set in the space between the inside of cover 401 and the outer wall of oil-storage tank A and is fixed on the skid 400. The oil outlet pipe of the oil-storage tank A is connected to the oil pump case. The oil outlet hose of the oil pump case passes through the automatic winch set on the skid 400 and connects with the refueling injector. The dimension of the whole equipment is determined based on the installation foundation of skid 400. In general, the width of the foundation is 2.5M, and the length is determined based on the designed length of the tank volume. For example, for a storage tank of 25M$^3$, its diameter is Φ2M, and the length of tank body is 8.5M; for a storage tank of 30M$^3$, the length of tank body is 10M.

According to different requirements, it is feasible to fix the skid on different positions to form the oil refueling equipment in different structural styles. The skid 400 may be fixed onto an anti-collision foundation to form a ground oil refueling equipment. This skid is easy to disassembly and assembly and may also be attached onto the fixed platform of a vehicle body or ship hull to form vehicle/ship mounted oil refueling equipment or connected on the tanker truck to form a tanker truck mounted oil refueling equipment.

Further, the high porosity lamellar explosion-proof material 11 is installed as a filling material in the interlayer of the oil-storage tank, and the explosion-proof material unit 1 is installed as a filling material in the inner chamber of the oil-storage tank. The fixed supporting part provided in the explosion-proof material unit can effectively prevent the high porosity lamellar material from collapse and distortion, so that the unit has adequate strength and elasticity. The metal protective mesh covered on the outside surface of the unit can effectively prevent the scraps generated by explosion-proof material unit from getting into the tank body, so as to effectively prevent the unexpected explosion hazards that may be caused by naked flame, static electricity, welding, gunshot, collision and faulty operation, thus the safety of the oil-storage tank can be ensure.

The oil-storage tank A of this explosion-proof and environment protective type oil refueling equipment is designed with double walled tank structure, which can effectively overcome the leakage and filtration of oil and/or gas and thus can protect the soil and the underground water resources in the periphery of the refueling station from serious pollution. In addition, this storage tank A is filled with a barrier explosion-proof material unit. Such barrier explosion-proof material can inhibit the volatilization of oil gas and thus can effectively reduce losses of petroleum products and the pollution caused by oil gas for atmospheric environment. According to statistic, for a medium-scale oil refueling station with annual sales of 5000 ton, such oil refueling equipment can annually reduce the losses of oil products by about 13 ton and thus can bring about considerable economic benefit. Therefore, the removable, explosion-proof and environment protective type ground oil refueling equipment provided by the present invention is an environment protective type product.

Embodiment 2

Figure 19:
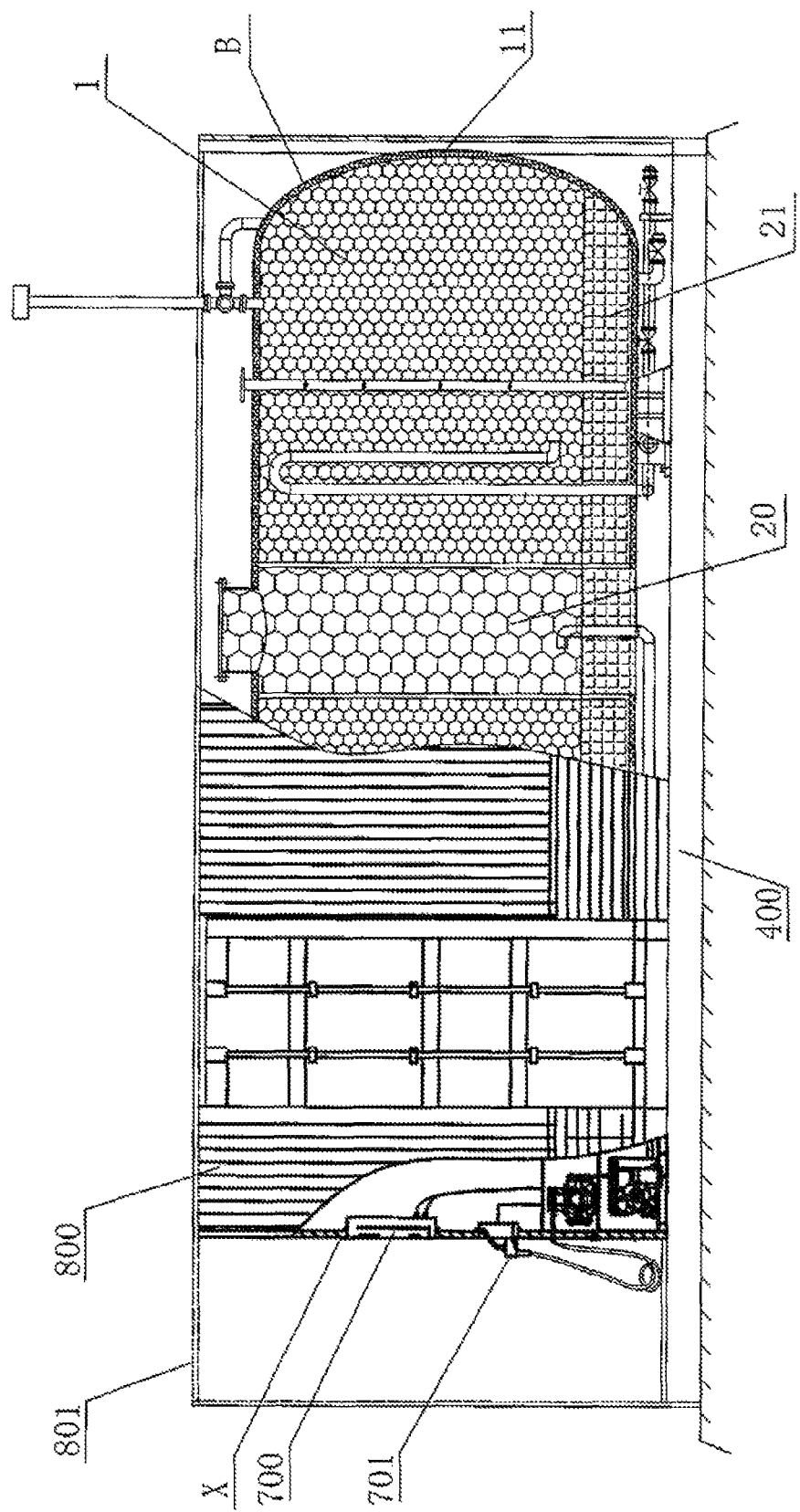
FIG. 19 is the overall structure scheme of the container type oil refueling equipment of embodiment 2 of present invention.

FIG. 19 is the overall structural scheme of the container type oil refueling equipment of embodiment 2 of present invention. As shown in FIG. 19, this embodiment provides a container mounted removable explosion proof oil refueling equipment on the ground. The storage tank B in this embodiment is a double walled tank. The high porosity lamellar material 11 is installed as a filling material in the interlayer between the two-layer tank walls, and the inner chamber of oil-storage tank is filled with a plurality of units 1. A vertical well 20 is provided in the tank body. The top of the well is on the position corresponding to the manhole in the tank body. This vertical well 20 is a structure that vertically extends along the radial direction of tank body, and its bottom being connected with the bottom cleaning tunnel 21 set at the bottom of tank body. A plurality of internal lining containers (not shown in the Figure) are set in the enclosure of vertical well 20, each of the internal lining container being filled with explosion-proof material unit. The space between the inner walls of the tank and outside of the vertical well 20 also is also filled with explosion-proof material units. As shown in FIG. 18, the outside of unit 1 is covered with the metal protective mesh W, which can effectively prevent the scraps generated by the explosion-proof material unit from getting into the tank body and from affecting the explosion-proof performance. When a plurality of units are installed as filling material in the inner chamber of storage tank B, two adjacent units 1 may be interconnected to guarantee its stability or may not be interconnected if situation allows. The connection between two adjacent units 1 may be achieved through connections between the skeletons or metal protective meshes between them. The structure of the oil refueling equipment in this embodiment is basically identical to that of the oil refueling equipment in embodiment 1. However all of the structure characteristics are limited by the volume of the container. The dimension of the container is generally selected as follows: Length of 12.192M, width of 2.438M and height of 2.890M. In this embodiment, it is feasible to adopt the oil-storage tank with volume of $25M^3$, diameter of $\Phi 2M$ and length of 8.5M or oil-storage tank with volume of $30M^3$, diameter of $\Phi 2M$ and length of 10M. The major components, such as the storage tank B and oil refueling machine X in this embodiment are integrated and mounted on the skid 400, the skid 400 being fixed on the inner bottom plate of container. In addition, the oil pipeline, oil unloading pump and valve connected with explosion-proof storage tank as well as the pump case of the disintegrated type oil refueling machine are mounted on the bottom plate in the container. The digital electronic display 700 and refueling injector 701 are set on the outer side of the container case 800. It is feasible to set a sun block 801 on the sides or both ends of the container case 800. In general, the length of the sun block 801 extending out of the container case 800 may be 0.5-0.8M.

With respect to the container type oil refueling equipment provided by the embodiment 2 of present invention, the explosion-proof material unit filling in the inner chamber of the oil-storage tank also has the fixed supporting part so as to effectively prevent the high porosity lamellar material from collapse and distortion, and thus the explosion-proof material unit has adequate strength and elasticity. The metal protective mesh covering the outside of the unit can effectively prevent the scraps generated by the explosion-proof material units from getting into the tank body, and thus safety of oil-storage tank can be ensured. Meanwhile the container type structure facilitates integral hoisting and relocation so that such equipment is particularly suitable for hoisting and freight in pier and port.

Embodiment 3

Figure 20:
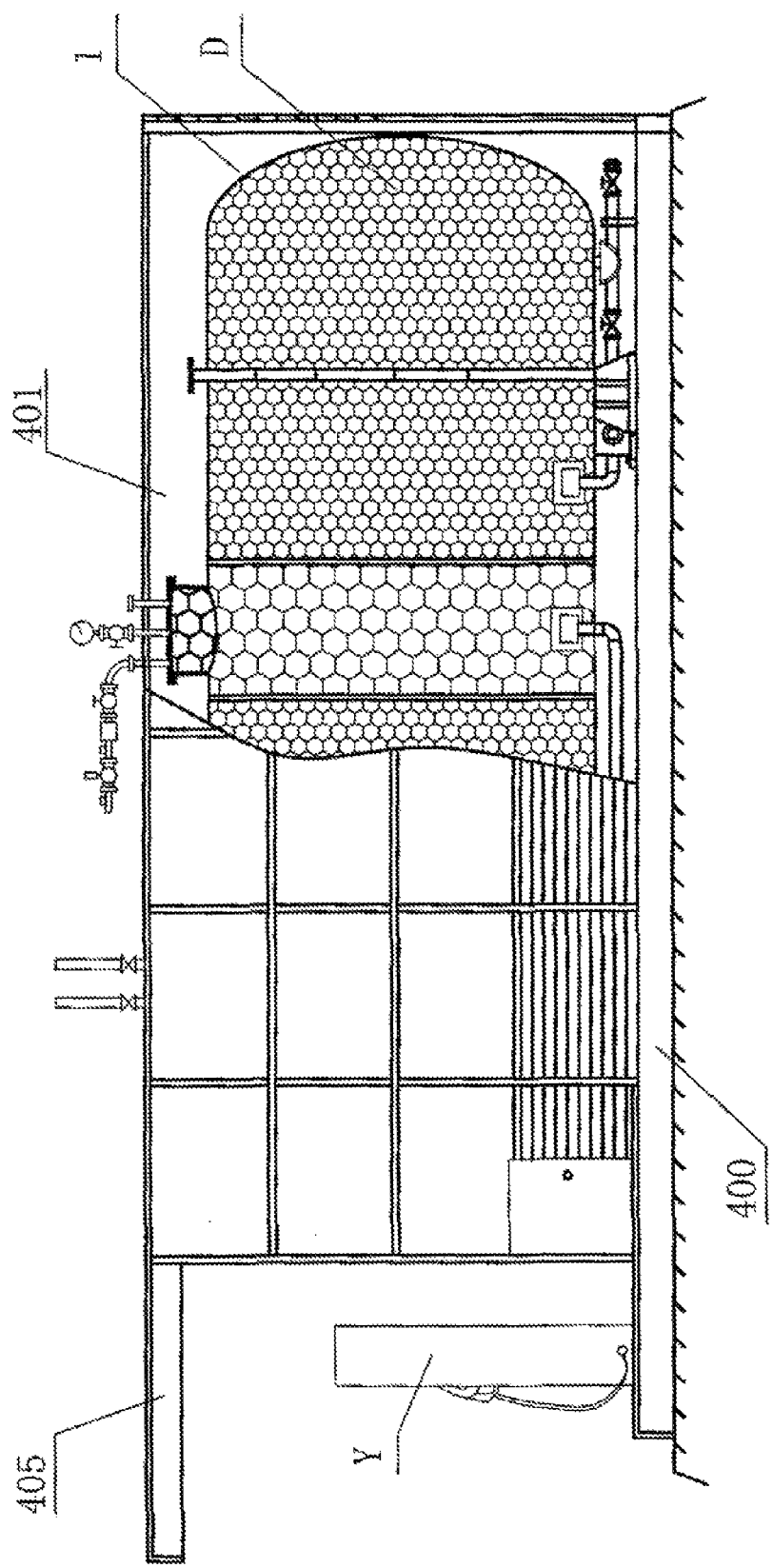
FIG. 20 is the overall structural scheme of ground liquefied petroleum gas refueling equipment of embodiment 3 of present invention.

FIG. 20 is the overall structural scheme of the ground liquefied petroleum gas refueling equipment of embodiment 3 of present invention. This equipment is set above ground and is used for refueling the LPGV automobiles with liquefied petroleum gas. This equipment mainly includes a gas storage tank D, a gas refueling machine Y, a skid 400 and a cover 401. The gas storage tank D, the gas refueling machine Y and the cover 401 are installed as filling material on the skid 400, the cover 401 being set on the outside of gas storage tank D. A liquid inlet tube, a liquid outlet tube, a gas phase reflux pipe and an exhaust pipe are set on the gas storage tank D. The skid 400 is provided with an unloading pump and a gas filling pump. The gas-refueling machine Y is set on one or two sides outside of the cover 401. A sun block 405 is set at the upper part of gas-refueling machine Y. The gas storage tank D is a pressure-bearing single walled liquefied petroleum gas storage tank which can bear pressure up to 1.8 MPa.

The inner chamber of gas storage tank is filled with units 1 of explosion-proof material in order, the structure of the units may be set in multiple modes show in FIG. 2-17. As shown in FIG. 18, the outside surface of unit 1 is covered with a metal protective mesh W which can effectively prevent the scraps generated by the explosion-proof material unit from getting into the tank body and from affecting the explosion-proof performance. When the inner chamber of storage tank D is filled with a plurality of units 1, any two adjacent units may be interconnected to prevent the units from loosening under the medium vibration caused by the pressure difference between the inside and the outside of the tank body. The connection between the adjacent units 1 may be achieved by means of connection between the skeletons or the metal protective meshes.

The single walled pressure-bearing storage tank provided in this embodiment belongs to small storage tank with volume less than 50 $m^3$, therefore a plurality of the units may be directly and orderly installed in the inner chamber of the storage tank one by one until the inner chamber of this storage tank is filled up with such units.

In this embodiment, the skid 400 is fixed on the anti-collision foundation so as to form a ground gas refueling equipment. In addition, since the structure of the skid is easy to disassemble and assemble the skid may also be attached onto the fixed platform of a vehicle body or ship hull to form a vehicle/ship mounted gas refueling equipment, or the skid may be installed onto a tanker truck to form a tanker truck mounted gas refueling equipment.

Further, the units filling in the inner chamber of the gas storage tank also have fixed supporting parts which effectively prevent the high porosity lamellar material from collapse and distortion, so that the unit body can have adequate strength and elasticity. The metal protective mesh covering the unit can effectively prevent the scraps generated by the explosion-proof material unit from getting into the tank body, thus the occurrence of the most likely happening hazard, "boiling liquid expanding-vapor explosion" of a LPG storage tank can be prevented and safety of the oil storage tank is ensured. Since the barrier explosion-proof material has large metal surface and a good heat-conducting property, the tank wall, after being heated, can quickly transfer the heat to the barrier explosion-proof material, and heat is subsequently transferred to the medium in the tank through the barrier explosion-proof material. Thus the tank wall temperature, especially the "dry wall" temperature, can be quickly reduced so that the occurrence of the above mentioned "BLEVE" can be avoided and the safety of the tank is ensured. At the same time, the explosion-proof material can function as an anode in tank and can effectively protect the tank wall and the internal components from corrosion, thus the service life of tank body is largely improved; meanwhile the explosion caused by the "tempering" of the combusting medium can also be prevented.

Embodiment 4

Figure 21:
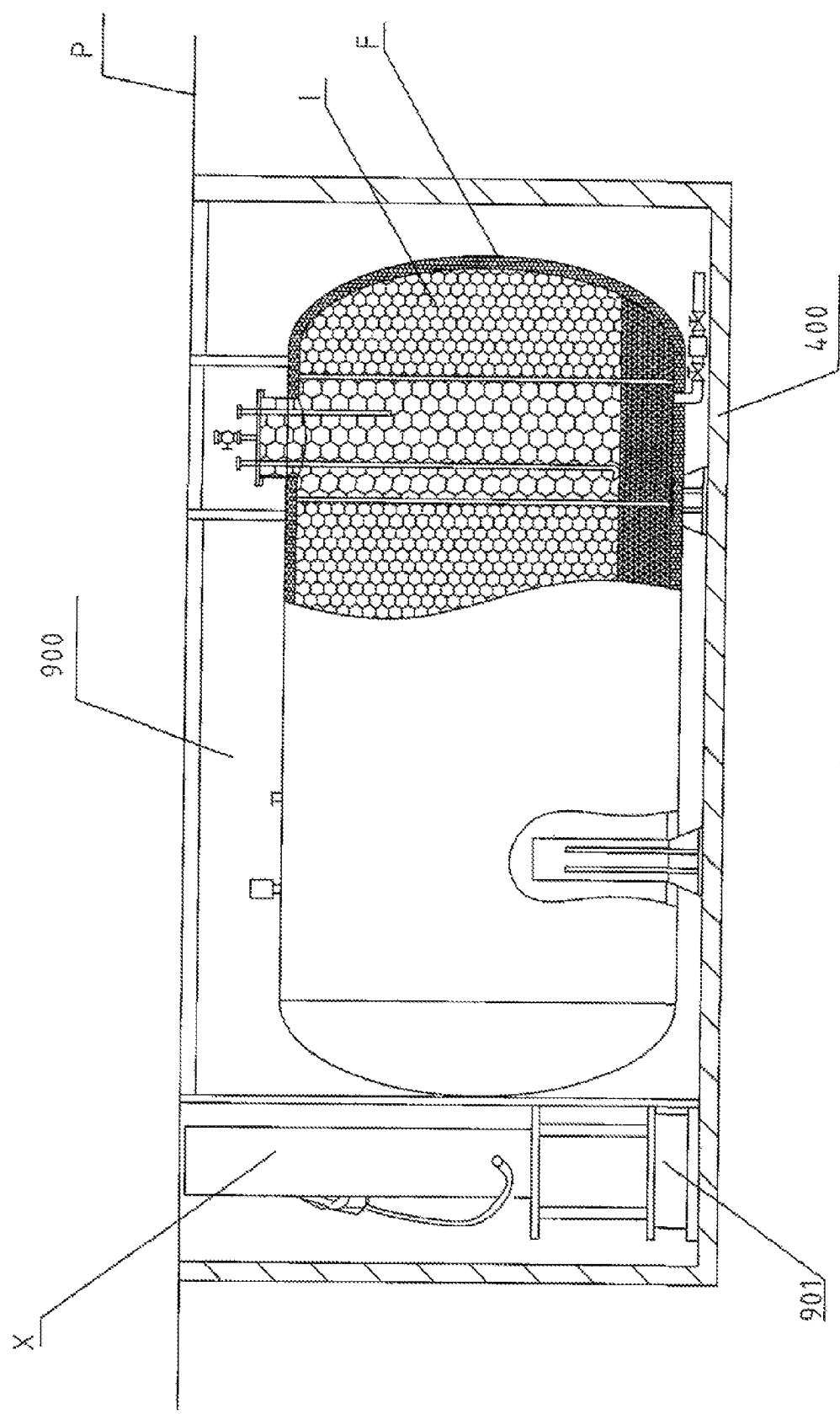
FIG. 21 is the overall structural scheme of the buried oil refueling equipment of embodiment 4 of present invention.

FIG. 21 is the overall structural scheme of the under ground oil refueling equipment of embodiment 4 of present invention. As shown in FIG. 21, this embodiment provides a buried oil refueling equipment comprising a refueling machine that can be a hoisted. The refueling equipment of this embodiment is an improved equipment based on the embodiment 1. For the purpose of safety, the storage tanks in the existing refueling station are buried in the underground tank pool and there is no explosion-proof measure in the storage tank. The refueling island is set above ground, and the ground refueling island must comply with the safety distance requirement. The oil refueling equipment of this embodiment comprises major components, such as the oil-storage tank F and an integrated type refueling machine X, are integrally mounted on skid 400, which is fixed on the foundation of tunnel 900. The problem of setting the distance between the oil-storage tank F and the refueling machine X may not be concerned in this embodiment. Being set under the horizontal bottom surface P, the tunnel 900 is an underground space formed out of steel reinforcing bars and concrete and can accommodate the entire oil refueling equipment. The refueling machine X is separated from the space of tunnel 900 and takes up an individual space. A hydraulic lift 901 is set under the refueling machine X. The oil inlet pipe of the refueling machine and the outlet pipe of the explosion-proof storage tank are connected with a hose. While being used, the refueling machine X is lifted using the hydraulic lift 901. While not being used, the refueling machine is lowered to the original position. The tunnel 900 must be waterproof and leakage tight. To prevent the leakage of oil and gas, the tunnel 900 is filled with some neutral sand and lamellar explosion-proof materials. As shown in FIG. 18, the explosion-proof material unit 1 in the storage tank is covered with the metal protective mesh W, which can effectively prevent the scraps generated by the explosion-proof material unit from getting into the tank body and causing adverse effects to the content medium in the tank. When the inner chamber of the oil-storage tank F is filled with a plurality of units 1, any two adjacent units may be interconnected to guarantee the stability or may not be connected. The connection between the adjacent units 1 may be achieved by connection means between the skeletons or between metal protective meshes. The method for filling the tank with explosion-proof material as well as the structural relationship between the explosion-proof material and the inner chamber of tank are identical to those described in embodiment 1, and unnecessary details will no longer be given herein. For the details, refer to the embodiment 1.

With respect to the buried oil refueling equipment provided in this embodiment, the interlayer between the walls of the tank in this equipment is filled with the high porosity lamellar explosion-proof material, and the inner chamber of the tank is filled with the explosion-proof material unit. The fixed supporting part provided for the explosion-proof material unit can effectively prevent the high porosity lamellar material from collapse and distortion, so that the unit has adequate strength and elasticity. The metal protective mesh covering the unit can effectively prevent the scraps generated by the explosion-proof material unit from getting into the tank body so as to effectively prevent the unexpected explosion hazards that may be caused by naked flame, static electricity, welding, gunshot, collision and faulty operation, thus ensuring the entity safety of oil refueling equipment. In addition, the oil refueling equipment provided in this embodiment is mounted in the tunnel, and the space above the tunnel can still be open for traffic, so that the occupied area is greatly reduced and the intrinsic safety of the refueling equipment is ensured.

Finally it must be mentioned as follows: Said embodiments are merely used to describe rather than limit the present invention. Although detailed description of the present invention is provided with reference to preferred embodiments, the skilled person in this field should understand that any of the modifications or equitable substitutions to the present invention without deviation from the spirit and range of present invention shall be covered by the claims of present invention.

The invention claimed is:

1. An explosion-proof and environment protective oil refueling equipment, comprising:
   an atmospheric double walled or two layer oil storage tank that can be connected to a refueling machine, the storage tank having an inner chamber;
   the inner chamber of said storage tank being filled with an explosion-proof material unit made of explosion-proof material that is a multi-layer material unit made of high porosity lamellar materials, and an interlayer between the two-layer tank walls thereof being filled with a high porosity lamellar material;
   a skid being set under the oil storage tank and the refueling machine; and
   a fixed supporting part in the explosion-proof material unit for fixing and supporting the unit, and
   wherein
   a plurality of said explosion-proof material units is orderly installed in the inner chamber of the oil storage tank,
   the fixed supporting part is a skeleton set in the space between any two layers of the high porosity lamellar materials of this unit for fixing and supporting the unit, wherein the skeleton selected from the group consisting of
   (1) an interweaved supporting frame and reinforcing rings, with the reinforcing ring being threaded in the middle of the supporting frame and being fixed onto it, the shape of skeleton corresponding to that of the unit;
   (2) upright columns being inserted between any two layers of the multi-layer high porosity lamellar materials of the unit and protruding from the upper and lower end faces of unit, and the crossbeam being adjoined with the parts of the upright column protruding from the upper and lower end faces of the unit,
   (3) more than one of frame, each frame being set between any two layers of the multilayer high porosity lamellar materials of the unit, and more than one of frames having a tops and bottoms that are mutually connected;
   and (4) two parts, namely the upper and lower skeletons, these upper and lower skeletons respectively including interconnected end frames and inserting frames, the end frames being so set as to covering the upper and lower end faces of the unit respectively, and the inserting frames being inserted and extended through the space between any two layers of the multilayer high porosity lamellar materials of the unit so as to fix and support the unit.

2. The explosion proof and environment protective oil refueling equipment of claim 1, wherein the inner chamber of the oil-storage tank is filled with said plurality of explosion-proof material units, with any two adjacent units being interconnected or not connected.

3. The explosion proof and environment protective oil refueling equipment of any one of claims 1, wherein the unit is covered with a metal protective mesh.

4. The explosion proof and environment protective oil refueling equipment of claim 3, wherein said skid is fixed onto an anti-collision foundation to form a ground oil refueling equipment, or it is attached to the elevating mechanism of refueling machine and the tunnel base of tank pool to form an underground oil refueling equipment, or it is attached with the fixed platform of a vehicle or ship hull to form a vehicle/ship mounted oil refueling equipments, or being fixed on the inner bottom plate of a container to form a container type oil refueling equipment.

5. An explosion-proof and environment protective gas filling equipment, comprising:
- a pressure-bearing single walled gas storage tank connected to a refueling machine, the storage tank having an inner chamber;
- an explosion-proof material unit that fills the inner chamber of the storage tank, the explosion-proof material unit comprising explosion-proof material that is multi-layer material unit made of high porosity lamellar materials;
- a fixed supporting part in the explosion-proof material unit for fixing and supporting the unit and
- a skid being set under the gas storage tank and the refueling machine;

wherein
- a plurality of said explosion-proof material units is orderly installed in the inner chamber of the gas storage tank, and wherein the fixed supporting part is a skeleton set in the space between any two layers of high porosity lamellar materials of the explosion-proof material unit for fixing and supporting the unit, wherein the skeleton selected from the group consisting of
  (1) an interweaved supporting frame and reinforcing rings, with the reinforcing ring being threaded in the middle of the supporting frame and being fixed onto it, the shape of skeleton corresponding to that of the explosion-proof material unit;
  (2) upright columns and crossbeams, with the upright columns being inserted between any two layers of the multi-layer high porosity lamellar materials of the explosion-proof material unit and protruding from the upper and lower end faces of unit, and the crossbeam being adjoined with the parts of the upright column protruding from the upper and lower end faces of the unit;
  (3) more than one of frame, each of the frames being set between any two layers of the multilayer high porosity lamellar materials of the explosion-proof material unit, and more than one of frames having a tops and bottoms that are mutually connected;
  and (4) upper and lower skeletons, both including interconnected end frames and inserting frames respectively; the end frames being so set as to cover the upper and lower end faces of the explosion-proof material unit respectively, and the inserting frames being inserted and extended through the space between any two layers of the multilayer high porosity lamellar materials of the explosion-proof material unit so as to fix and support the unit.

6. The explosion proof and environment protective gas refueling equipment of claim 5, wherein a plurality of explosion-proof material units are installed as filling material in the inner chamber of gas storage tank, and any two adjacent explosion-proof material units being interconnected.

7. The explosion proof and environment protective gas refueling equipment of any one of claims 1, wherein the material unit is covered with a metal protective mesh.

8. The explosion proof and environment protective gas refueling equipment of claim 5, wherein said skid is fixed onto an anti-collision foundation to form a ground gas refueling equipment, or it is attached with the elevating mechanism of a gas refueling machine and the tunnel base of tank pool to form an underground gas refueling equipment, or it is connected with the fixed platform of a vehicle body or ship hull to form a vehicle/ship mounted gas refueling equipment, or is fixed on the inner bottom plate of a container to form a container mounted type gas refueling equipment.

* * * * *